(12) United States Patent
Minowa

(10) Patent No.: US 7,737,990 B2
(45) Date of Patent: Jun. 15, 2010

(54) COLORIZATION PROCESS AND SYSTEM AND USER INTERFACE FOR SETTING COLORIZATION INFORMATION

(75) Inventor: Masahiro Minowa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/951,527

(22) Filed: Dec. 6, 2007

(65) Prior Publication Data

US 2008/0123142 A1 May 29, 2008

Related U.S. Application Data

(62) Division of application No. 10/384,427, filed on Mar. 7, 2003, now abandoned.

(30) Foreign Application Priority Data

| Mar. 8, 2002 | (JP) | ............................. 2002-063863 |
| Mar. 18, 2002 | (JP) | ............................. 2002-074892 |

(51) Int. Cl.
*G09G 5/02* (2006.01)
(52) U.S. Cl. .................. 345/593; 345/589; 345/594
(58) Field of Classification Search .............. 345/594, 345/650, 661, 676, 593; 358/2.1
See application file for complete search history.

(56) References Cited

U.S. PATENT DOCUMENTS

| 4,990,009 | A |   | 2/1991 | Stewart |
| 5,113,356 | A |   | 5/1992 | Nickell et al. |
| 5,289,297 | A | * | 2/1994 | Bollman et al. ............. 358/537 |
| 5,481,741 | A |   | 1/1996 | McKaskle et al. |
| 5,534,915 | A |   | 7/1996 | Sandrew |
| 5,572,599 | A |   | 11/1996 | Tse |
| 5,751,921 | A | * | 5/1998 | Fujimoto ................... 358/1.9 |
| 5,805,196 | A |   | 9/1998 | Nakanishi et al. |
| 5,930,385 | A |   | 7/1999 | Fujimoto et al. |
| 6,206,504 | B1 | * | 3/2001 | Payne .......................... 347/43 |
| 6,226,397 | B1 |   | 5/2001 | Yamagata et al. |
| 6,249,354 | B1 |   | 6/2001 | Nagatani |
| 6,278,529 | B1 |   | 8/2001 | Akimoto |
| 6,701,011 | B1 |   | 3/2004 | Nakajima |
| 6,885,382 | B1 |   | 4/2005 | Matsuzaki et al. |
| 6,961,710 | B1 |   | 11/2005 | Yanagisawa et al. |
| 6,980,324 | B1 |   | 12/2005 | Lida |
| 7,424,443 | B2 |   | 9/2008 | Yanagisawa et al. |
| 2002/0175964 | A1 |   | 11/2002 | Ames et al. |
| 2004/0012816 | A1 |   | 1/2004 | Minowa |
| 2008/0123142 | A1 |   | 5/2008 | Minowa |

FOREIGN PATENT DOCUMENTS

| JP | 03136164 | 6/1991 |
| JP | 06127040 | 5/1994 |
| JP | 06328790 | 11/1994 |
| JP | 07223346 | 8/1995 |
| JP | 08052911 | 2/1996 |
| JP | 08174919 | 7/1996 |
| JP | 08197780 | 8/1996 |
| JP | 09193477 | 7/1997 |

(Continued)

*Primary Examiner*—Hau H Nguyen

(57) ABSTRACT

To implement a colorization process which generates color data from monochrome data to print a receipt or other sales document, a user interface is provided. Such interface includes components for setting text color, background color and background style, respectively. The interface enables visual conformation of the settings to be used in the colorization process.

8 Claims, 18 Drawing Sheets

COLORIZATION INFORMATION
38

| FIELD | VALUE |
|---|---|
| LINE UNIT | n (INTEGER) |
| COLORIZATION METHOD | TEXT COLOR OR BACKGROUND COLOR |
| BACKGROUND PATTERN | HALFTONE, DIAGONAL SLASHES, SOLID FILL |
| BACKGROUND TONE | DARK, MEDIUM, LIGHT |
| IMAGE COLOR | FIRST (MAIN) COLOR OR SECOND (SUB) COLOR |

FOREIGN PATENT DOCUMENTS

| | | |
|---|---|---|
| JP | 09277645 | 10/1997 |
| JP | 10024624 | 1/1998 |
| JP | 10143764 | 5/1998 |
| JP | 2000272174 | 10/2000 |
| JP | 2000322654 | 11/2000 |
| JP | 2002014792 | 1/2002 |
| JP | 2002042252 | 2/2002 |
| JP | 2002046306 | 2/2002 |
| JP | 2003330690 | 11/2003 |
| WO | 0213131 A2 | 2/2002 |

* cited by examiner

COLORIZATION INFORMATION
38

| FIELD | VALUE |
|---|---|
| LINE UNIT | n (INTEGER) |
| COLORIZATION METHOD | TEXT COLOR OR BACKGROUND COLOR |
| BACKGROUND PATTERN | HALFTONE, DIAGONAL SLASHES, SOLID FILL |
| BACKGROUND TONE | DARK, MEDIUM, LIGHT |
| IMAGE COLOR | FIRST (MAIN) COLOR OR SECOND (SUB) COLOR |

FIG. 4

SHINSHYU GROCERS, SHIOJIRI STORE

| | | | |
|---|---|---|---|
| | 2002.FEB.14 | | ⎫ 2 LINES |
| BEEF | 500 G | 1,380 | ⎭ |
| EGGS | 10 | 200 | ⎫ 2 LINES |
| MILK | 1 LTR | 178 | ⎭ |
| ORANGE JUICE | 1 PK | 210 | ⎫ 2 LINES |
| CHOCOLATE | 2 | 230 | ⎭ |
| CARROTS | | 430 | ⎫ 2 LINES |
| LETTUCE | | 150 | ⎭ |
| CUP NOODLE | 5 | 620 | ⎫ 2 LINES |
| BUN | 3 | 300 | ⎭ |
| DETERGENT | I CASE | 520 | ⎫ 2 LINES |
| TOILET PAPER | 1 PK | 398 | ⎭ |
| TISSUE PAPER | 5 | 298 | ⎫ 2 LINES |
| TOTAL | | 4,914 | ⎭ |

FIG. 5

38 COLORIZATION INFORMATION

| FIELD | VALUE |
|---|---|
| LINE UNIT | n (INTEGER) |
| BACKGROUND COLOR | FIRST (MAIN) COLOR OR SECOND (SUB) COLOR |
| BACKGROUND PATTERN | HALFTONE, DIAGONAL SLASHES, SOLID FILL |
| BACKGROUND DENSITY | DARK, MEDIUM, LIGHT |
| TEXT COLOR | FIRST (MAIN) COLOR OR SECOND (SUB) COLOR |
| IMAGE COLOR | FIRST (MAIN) COLOR OR SECOND (SUB) COLOR |

FIG. 10

38 COLORIZATION INFORMATION

| FIELD | VALUE |
|---|---|
| LINE UNIT | n (INTEGER) |
| BACKGROUND COLOR | FIRST (MAIN) COLOR, SECOND (SUB) COLOR, MIX |
| BACKGROUND PATTERN | HALFTONE, DIAGONAL SLASHES, SOLID FILL |
| BACKGROUND DENSITY | DARK, MEDIUM, LIGHT |
| TEXT COLOR | FIRST (MAIN) COLOR, SECOND (SUB) COLOR, MIX |
| IMAGE COLOR | FIRST (MAIN) COLOR, SECOND (SUB) COLOR, MIX |

FIG. 12

| FIELD | VALUE |
| --- | --- |
| COLORIZATION FLAG | SET (ENABLE) OR CLEAR (DISABLE) |
| IMAGE COLOR | FIRST (MAIN) COLOR OR SECOND (SUB) COLOR |
| TEXT COLOR | FIRST (MAIN) COLOR OR SECOND (SUB) COLOR |
| TEXT BACKGROUND | APPLY OR NOT APPLY |
| TEXT LINE UNIT | INTEGER VALUE |

FIG. 15

COLORIZATION PROCESS AND SYSTEM AND USER INTERFACE FOR SETTING COLORIZATION INFORMATION

This application is a divisional of, and claims priority under 35 U.S.C. §120 on, U.S. application Ser. No. 10/384,427 filed on Mar. 7, 2003, the contents of which are incorporated by reference herein.

BACKGROUND OF THE INVENTION

1. Field of the Invention

The present invention relates generally to a printing system capable of printing in two or more colors and to a printing control method for the same. This invention also relates to a printer capable of printing in two or more colors, and to a printer system and POS system using this printer. This invention further relates to a colorization setup device and a color data setting method for setting colorization information for producing color print data from a print command for monochrome printing. The invention also relates to a computer-readable medium storing or carrying a program for executing these methods of the invention on a computer.

2. Description of the Related Art

POS systems used at check-out registers have a printer for printing receipts. These POS printers print the name and price of each purchased product line by line on the printing medium, typically roll paper, and the printed paper is then cut and issued as a receipt. The customer receiving this receipt may later transfer product name and price information from the receipt to a home budget ledger, for example, to keep the ledger as a personal record of past purchases. Most such receipts are printed with one color, often making the printed content difficult to read. Errors can thus easily occur when transferring information from the receipt to the ledger.

In the last few years ink-jet and thermal transfer color printers for use with personal computers have become widely available. Color printers capable of printing two or more colors for use with POS systems are also becoming more common. Using these printers to print receipts in color can make the receipts easier to read and is thus desirable for improved customer service.

Many application programs used in POS systems, however, were formed assuming that a conventional monochrome printer would be used. This has meant that color receipts could not be printed by simply replacing the existing monochrome printer with a color printer because the application program itself must be modified for color printing. Changing the program is typically costly, and the financial burden on the POS user, that is, store, is thus great.

It is therefore desirable to be able to print color receipts with a color printer while continuing to use existing application programs that presume use of a monochrome printer.

In addition to text data such as product names and price information, such printers are also used to print images such as the store's logo. For the content printed to the receipts, it is usually necessary to print the store's logo and other such image data in the color specified by the store. It is therefore further desirable when printing color receipts to separately define how color is used to print text data and image data. It is yet further desirable for the user to be able to specify how and what colors are used for the color print data.

OBJECTS OF THE INVENTION

An object of the present invention is to solve these problems by providing a colorization process to print in color data based on monochrome print data.

Another object of this invention is to provide a user interface for setting colorization information to enable the setting of text color, background color, and background style.

SUMMARY OF THE INVENTION

According to one aspect of the present invention, a system for performing a colorization process from monochrome print data to color data for printing a receipt or other sales document in two or more colors is provided. The system comprises an application for displaying a user interface for setting colorization information for performing the colorization process. The user interface includes a component for setting a color of text, a component for setting a background color, and a component for setting a background style having alternating background color and non-colored portions, the background style setting component enabling the setting of a frequency of the alternating background color and non-colored portions on a number of lines basis. The system additionally comprises a memory in which the colorization information set via the user interface is stored and from which colorization information can be read for display. In accordance with the invention, the user interface enables visual confirmation of the settings to be used in the colorization process.

In another aspect, the invention embodies a system for performing a colorization process from monochrome print data to color data for printing a receipt or other sales document in two or more colors. The system comprises an application for displaying a user interface for setting colorization information for performing the colorization process. The user interface includes a component for setting a color of text, a component for setting a background color, and a component for setting a background style. The system further comprises a memory in which the colorization information set via the user interface is stored and from which colorization information can be read for display. In accordance with the invention, the user interface enables visual confirmation of the settings to be used in the colorization process.

In either aspect, the user interface further preferably comprises a component for setting a background pattern and/or a component for setting an image color. Another preferred feature of either aspect is the capability of individually setting each of the text and background to one or the other of two colors Preferably, the application for displaying the user interface comprises a point-of-sale application and the system includes a point-of-sale printer.

According to another aspect of the invention, a method for performing a colorization process from monochrome print data to color data for printing a receipt or other sales document in two or more colors is provided. The method comprises displaying a user interface for setting colorization information for performing the colorization process, the user interface including a component for setting a color of text, a component for setting a background color, and a component for setting a background style; receiving and processing colorization information settings, including a text color setting, a background color setting and a background style setting, input via the user interface: and storing the colorization information set via the user interface. In accordance with the invention, the user interface enables visual confirmation of the settings to be used in the colorization process.

Preferably, the component for setting the background style includes functionality for setting the background as alternating background color and non-colored portions and a frequency of the alternating background color and non-colored portions on a number of lines basis; and the receiving and processing of the background style setting comprises receiving and processing a request to alternate the background color and non-color portions at a specific frequency.

The invention in its various aspects advantageously provides an environment in which a color conversion process can be easily controlled and verified by a user. The information input into the system via the user interface can be read from memory on an as-needed basis, so the user can visually confirm the present color conversion settings and reset or change any of the settings as needed. The claimed invention has particular utility in a POS printer system in a retail shop environment, and its purpose is to provide an easy-to-read receipt for a customer in the shop. To achieve this purpose, the invention enables the system user to determine the "look" of a receipt by changing the settings of the user interface.

In accordance with further aspects of the invention, aspects of the above-described systems or method may be embodied in a program of instructions (e.g., software) which may be stored on, or conveyed to, a computer or other processor-controlled device for execution. Alternatively, suitable functions or method steps may be implemented using functionally equivalent hardware (e.g., ASIC, digital signal processing circuitry, etc.) or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 shows an example of the content of colorization information in a first embodiment of the invention;

FIG. 5 shows a sample printout of a receipt in a first embodiment of the invention;

FIG. 10 shows an example of colorization information when the text color and background color can be separately defined in a first embodiment of the invention;

FIG. 12 shows an example of colorization information content for a printer having a function for printing in three colors, a first color, a second color, and a blend of the first and second colors, in a first embodiment of the invention;

FIG. 15 shows an example of the content of colorization information in a second embodiment of the invention;

DESCRIPTION OF THE PREFERRED EMBODIMENTS

Preferred embodiments of the present invention are described below with reference to the accompanying figures.

Embodiment 1

Figure 1:
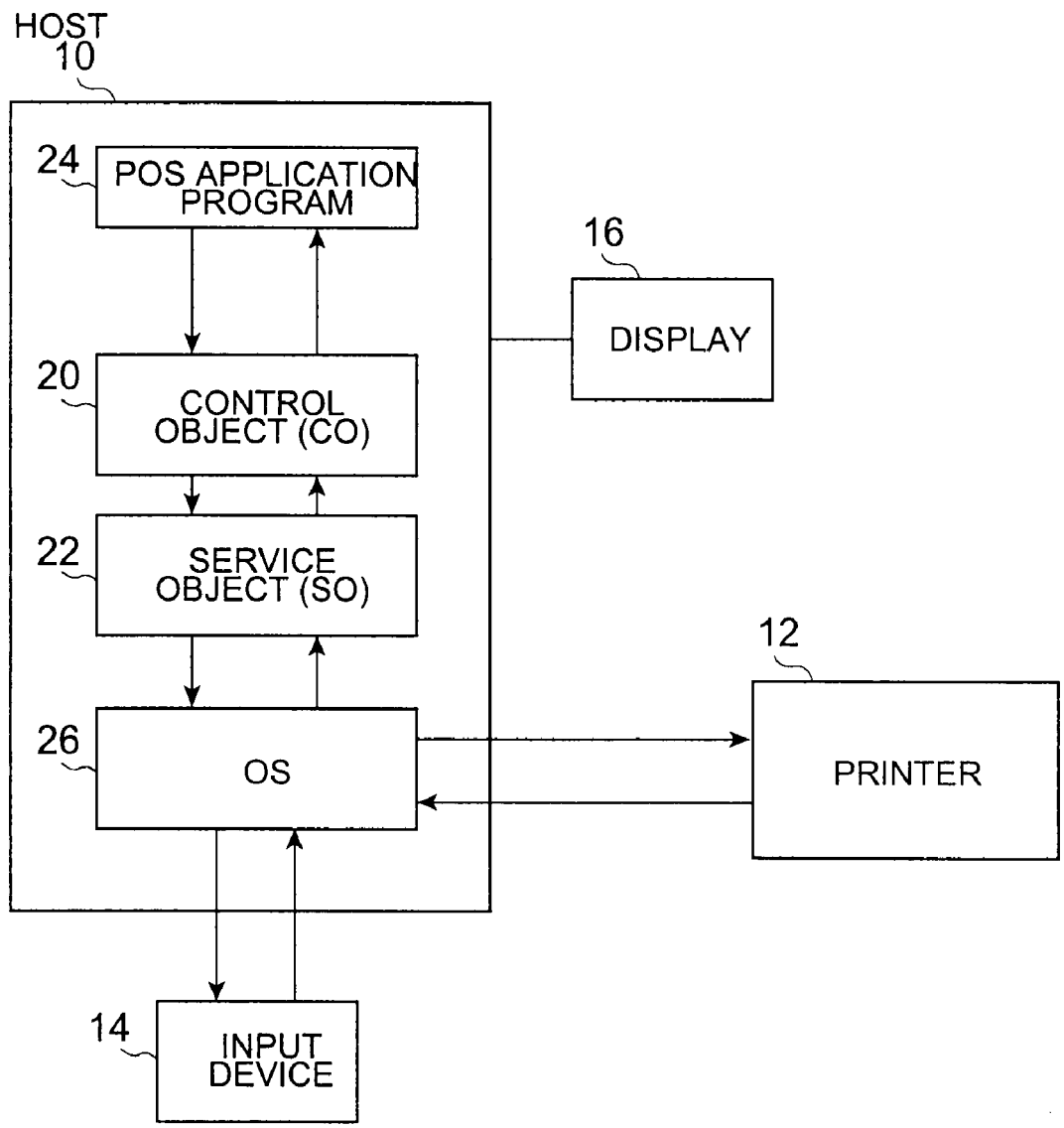
FIG. 1 is a block diagram of a POS system according to a first embodiment of the present invention.

FIG. 1 is a block diagram of a POS system according to a first embodiment of the present invention. As shown in FIG. 1 a POS system according to this first embodiment of the invention has a host 10. Connected to the host 10 are a printer 12 for printing receipts, an input device 14 (such as a barcode reader) for entering product codes, and a display 16 for preventing information and prompts.

The printer 12 in this first embodiment is an ink-jet printer or other type of printer capable of printing two colors, a first (main) color (such as black) and a second (sub) color (such as red or blue), and is used to print receipts as controlled by the host 10. As further described below the printer 12 is not limited to a two-color printer and could be a printer capable of printing three or more colors. The printer 12 is also not limited to an ink-jet printer, and could be a thermal transfer printer or any other type of printer capable of printing in two or more colors.

The host 10 is a computer system that controls the printer 12 by means of a printer driver, for example, OPOS (OLE for Retail POS), JavaPOS® (Java for Retail POS). The driver runs under the OS such as Windows® operating system and functions as a device-independent interface between a POS application program 24 running on the OS and peripheral devices as the printer 12 and input device 14. To achieve this functionality the printer driver has a device control object (CO) 20 for each device category and a service object (SO) 22 for each device model.

The POS application program 24 tabulates sales data based on the product codes for the products input from the input device 14, and outputs print data for printing the tabulated result as a receipt. The print data output from the POS application program 24 is passed to the printer control object (CO) 20, and is passed from the control object (CO) 20 to the service object (SO) 22 corresponding to the particular printer 12 model. The service object (SO) 22 processes the print data for the printer to generate a print command according to the command specifications of the printer 12, and then sends the print command to the printer 12 through the OS 26. The service object (SO) 22 thus absorbs differences between different models of devices (specifically printers in this embodiment), and thus enables the POS application program 24 to be written as a program that is not dependent on a particular device model.

A printer 12 according to this first embodiment of the invention is designed so that it can interpret and run two types of print commands, a text print command and an image print command.

A text print command is a command for printing text. Text color, the text background pattern, and the background color can be specified in the text print command in this first embodiment. Selectable background patterns include, for example, a halftone pattern, diagonal striping, crosshatch, or solid fill, and the density of the background pattern can be specified as dark, medium, or light, for example.

The image print command is a command for printing graphical images. In this first embodiment of the invention the image print command can be used to specify the print color of the image and to select image data pre-stored in the printer 12 for printing as the print image.

It will be apparent that these commands are described by way of example only, and other command formats can be used insofar as the print command can send the equivalent printing instructions to the printer 12. More specifically, any command system that can send text and image printing instructions to the printer 12, and can specify the print color, background pattern, and background color for text and the colors used to print the image data can be used.

The print data passed to the printer control object (CO) 20 from the POS application program 24 in this first embodiment of the invention uses the data format to differentiate between print data for text (i.e., text data such as the product name and price information printed to the receipts) and print data for images (such as a store logo). The service object (SO) 22 determines whether the print data passed from the control object (CO) 20 is text data or image data and based on the result generates and passes to the printer 12 either a text print command or an image print command. The printer 12 runs a printing process according to the print command sent from the service object (SO) 22.

Figure 2:
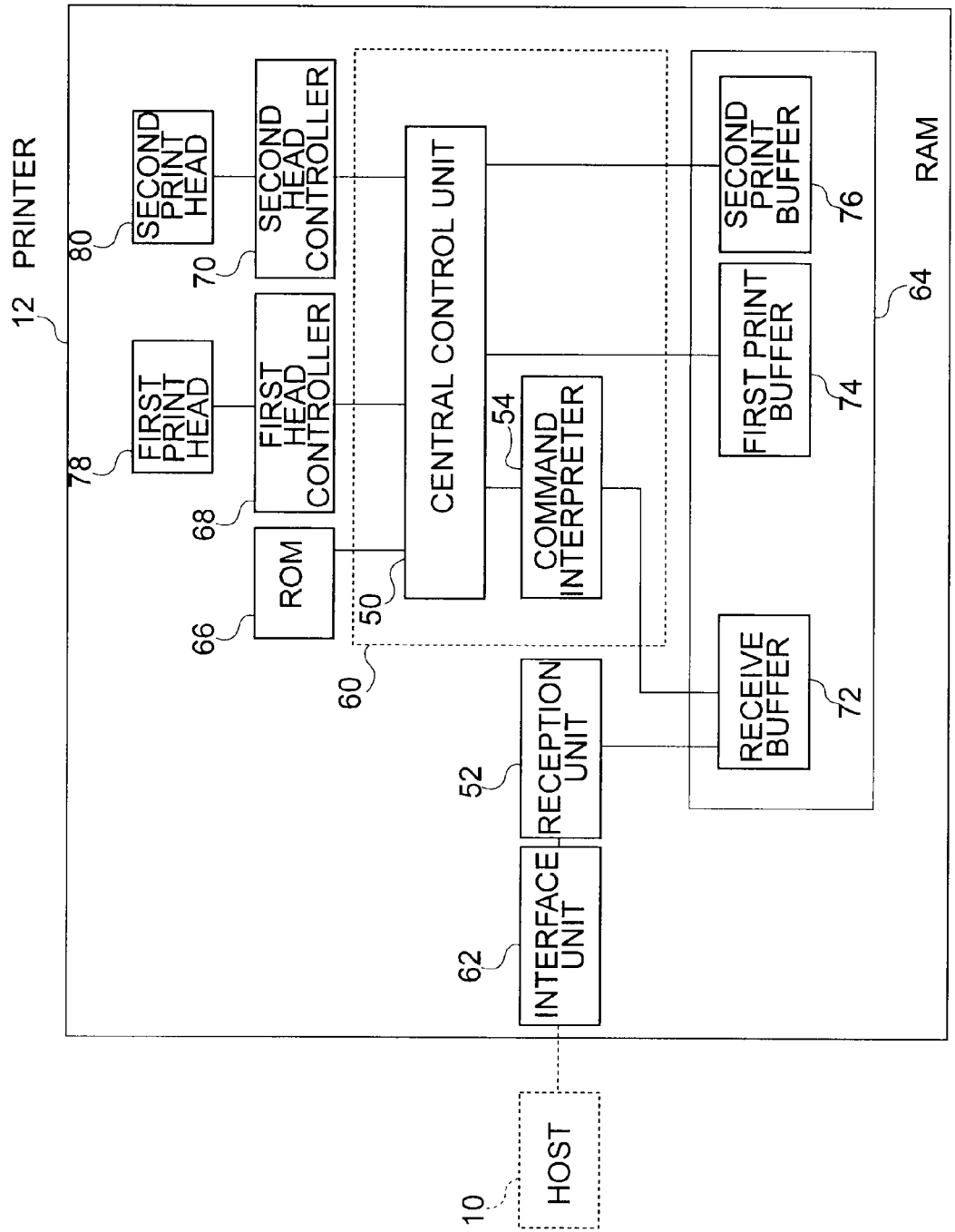
FIG. 2 is a function block diagram of a printer used in a POS system according to a first embodiment of the invention.

FIG. 2 is a function block diagram of the printer 12. As shown in this figure the printer 12 has a central control unit 50, reception unit 52, and command interpreter 54. The central control unit 50 interprets commands and data received from the host 10 by the reception unit 52 through the interface unit 62 by means of the command interpreter 54 and then runs a process appropriate to the received command. It should be noted that the central control unit 50 and command interpreter 54 can be achieved by the CPU 60 running a specific control program.

Connected to the CPU 60 are RAM 64, ROM 66, a first head controller 68, and a second head controller 70.

Disposed in the RAM 64 are a receive buffer 72, first print buffer 74, and second print buffer 76. Commands and data received by the reception unit 52 from the host 10 are stored to the receive buffer 72. Print data of the first (main, or primary) color is stored to the first print buffer 74, and print data of the second (sub, or secondary) color is stored to the second print buffer 76.

Programs run by the CPU 60, bit patterns for each character, and image data for a logo and other print images are stored in ROM 66.

A first print head 78 and a second print head 80 are connected respectively to the first head controller 68 and second head controller 70. The first print head 78 is used to print the main color and the second print head 80 is used to print the sub color. More specifically, the first print head 78 and second print head 80 print the print data stored in the first print buffer 74 and second print buffer 76 in the first (main) and second (sub) colors as respectively controlled by the first head controller 68 and second head controller 70.

Based on commands interpreted by the command interpreter 54, the central control unit 50 stores print data to the first print buffer 74 and second print buffer 76. More specifically, if the command is a text print command, the bit pattern data for the characters to be printed is read from ROM 66 and the bit pattern data is stored to the first print buffer 74 if the print color is the first (main) print color, and to the second print buffer 76 if the print color is the second (sub) print color. If background printing is also specified in the text print command, bit pattern data for the indicated background pattern and density is stored to the first print buffer 74 or second print buffer 76 appropriately according to the background color. Likewise if an image print command is received the bit pattern data for the image to be printed is read from ROM 66 and is stored to the first print buffer 74 or second print buffer 76 according to the print color similarly to storing the text print data. Printing in two colors, i.e., the first color and the second color, can then be done by supplying the print data from the first print buffer 74 and second print buffer 76 to the first head controller 68 and second head controller 70, respectively.

A POS system according to this first embodiment of the invention thus has a function for two-color printing with this printer 12 by generating a print command adding a second color to the monochrome print data output from the POS application program 24. This function is referred to herein as a "colorization function." It should be understood that this term "colorization function" also applies to the case that all of the text is printed in one color, for instance, the first color, while an image is printed in the other color.

Figure 3:
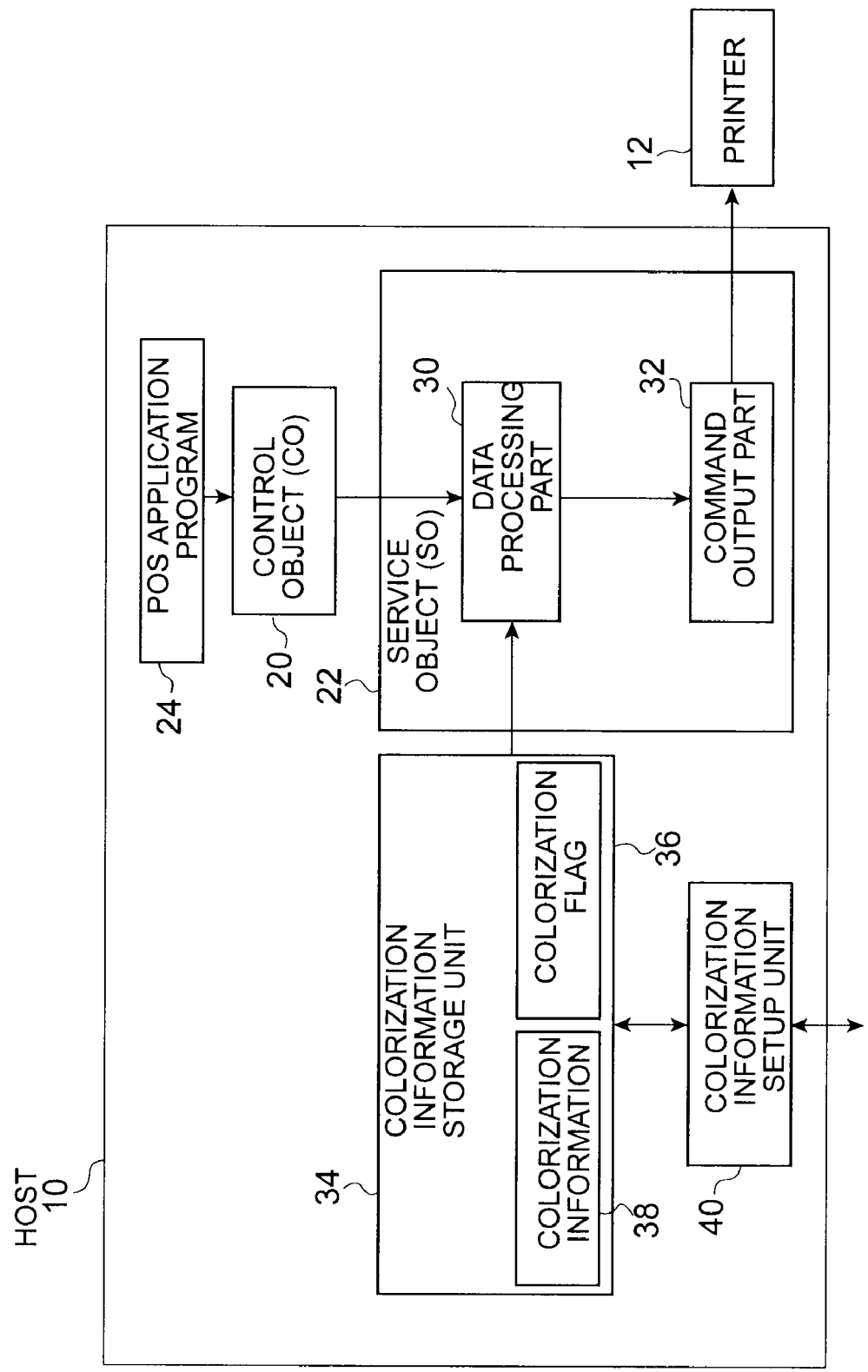
FIG. 3 is a function block diagram of a host for implementing a colorization function in a first embodiment of the invention.

FIG. 3 is a function block diagram for a host 10 implementing this colorization function. As shown in the figure the service object (SO) 22 has a data processing part 30 and a command output part 32. The data processing part 30 runs a process for adding a second color to the monochrome print data passed from the control object (CO) 20 (a process called the "colorization process" below), and generates a print command according to the command specifications of the printer 12. The resulting print command is then output from the command output part 32 to the printer 12.

As shown in FIG. 3 a colorization information storage unit 34 is also provided in the host 10. A colorization flag 36 indicating whether or not to enable the colorization process, and colorization information 38 specifying the content of the colorization process, are stored as definition data, e.g., in the form of a definition data file, in the colorization information storage unit 34. The colorization information storage unit 34 is stored to rewritable nonvolatile storage such as a hard disk drive or EEPROM.

FIG. 4 shows an example of the details of the colorization information 38. As shown in this figure the colorization information 38 includes such fields as the line unit, colorization method, background pattern, background tone, and image data print color. These fields are further described below.

(1) Line unit: Denotes the number of lines to which the colorization process is alternately applied and not applied. For example, if the line unit is set to 2, the colorization process is alternately applied to two lines and not applied to the next two lines as shown in FIG. 5.

(2) Colorization method: Defines whether the colorization process adds color to the printed text or adds color to the background.

(3) Background pattern: Denotes the background pattern when background color is added. The background pattern is set to halftone, diagonal slashes, or solid, for example.

(4) Background tone: Denotes the density of the background color when the colorization process adds a background color. In this embodiment the background tone is set to one of three levels, dark, medium, and light. The number of levels of the tone can be increased on an as-needed basis.

(5) Image print color: Denotes the print color of image data such as the store logo printed to each receipt, and is set to either the first color or second color.

The content of the colorization information 38 can be set by the user from a dialog box or window presented on screen by the colorization information setup unit 40, for example.

Figure 6:
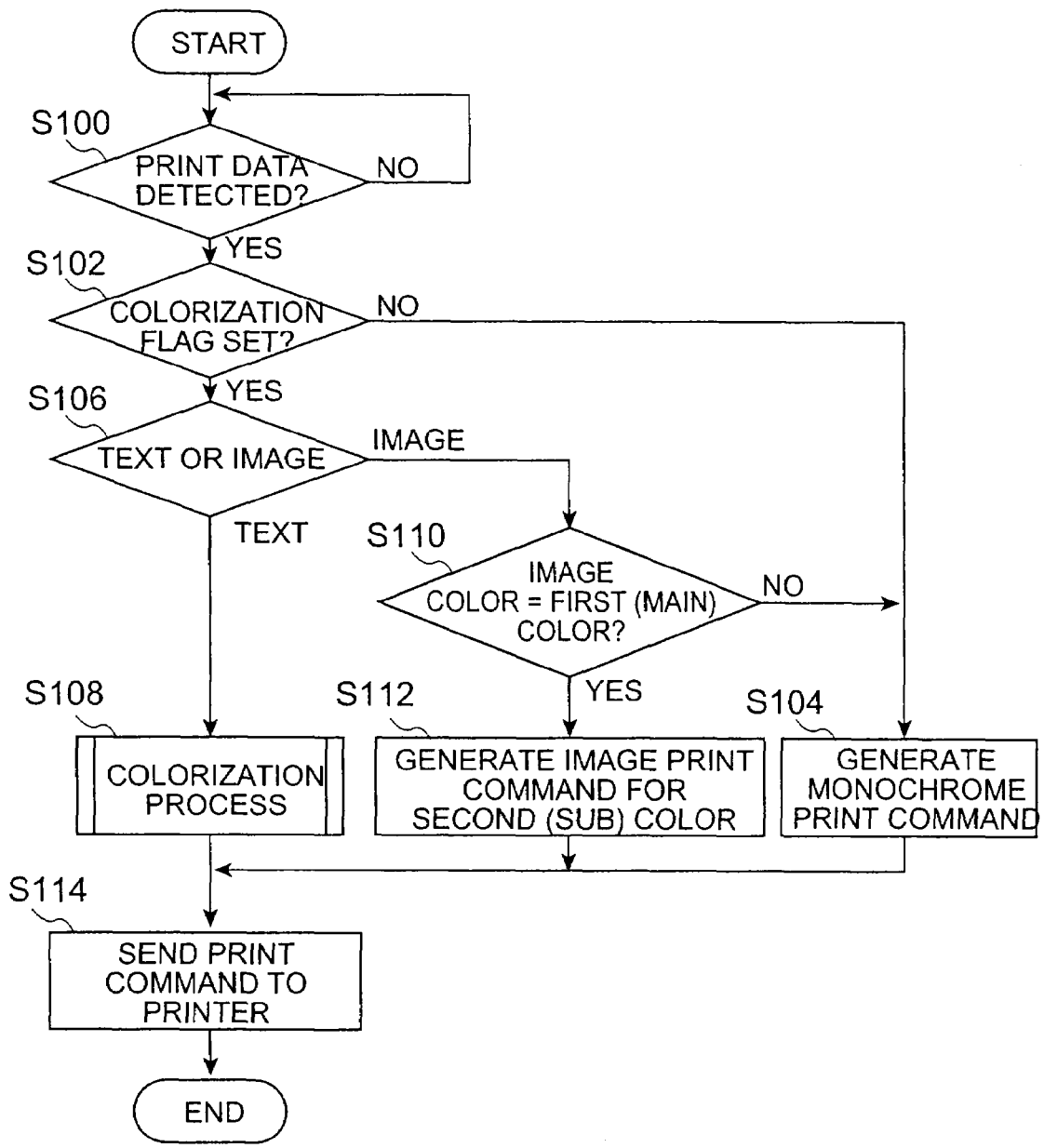
FIG. 6 is a flow chart showing the content of a program for achieving a data processing part and command output part in a first embodiment of the invention.

The data processing part 30 and command output part 32 are achieved by running a program embedded in the service object (SO) 22. FIG. 6 is a flow chart showing the content of this program as described below.

As shown in FIG. 6 when print data is passed from the POS application program 24 through the control object (CO) 20 (S100), it is determined whether or not the colorization flag 36 is set (S102). If the colorization flag 36 is not set, a normal command generation process for converting the print data to a print command for the printer 12 runs (S104). If the colorization flag 36 is set, the print data is interpreted to determine if it is text print data or print data for one of the stored images (S106). If it is text print data, a colorization process is run based on the colorization information 38 (S108).

Figure 7:
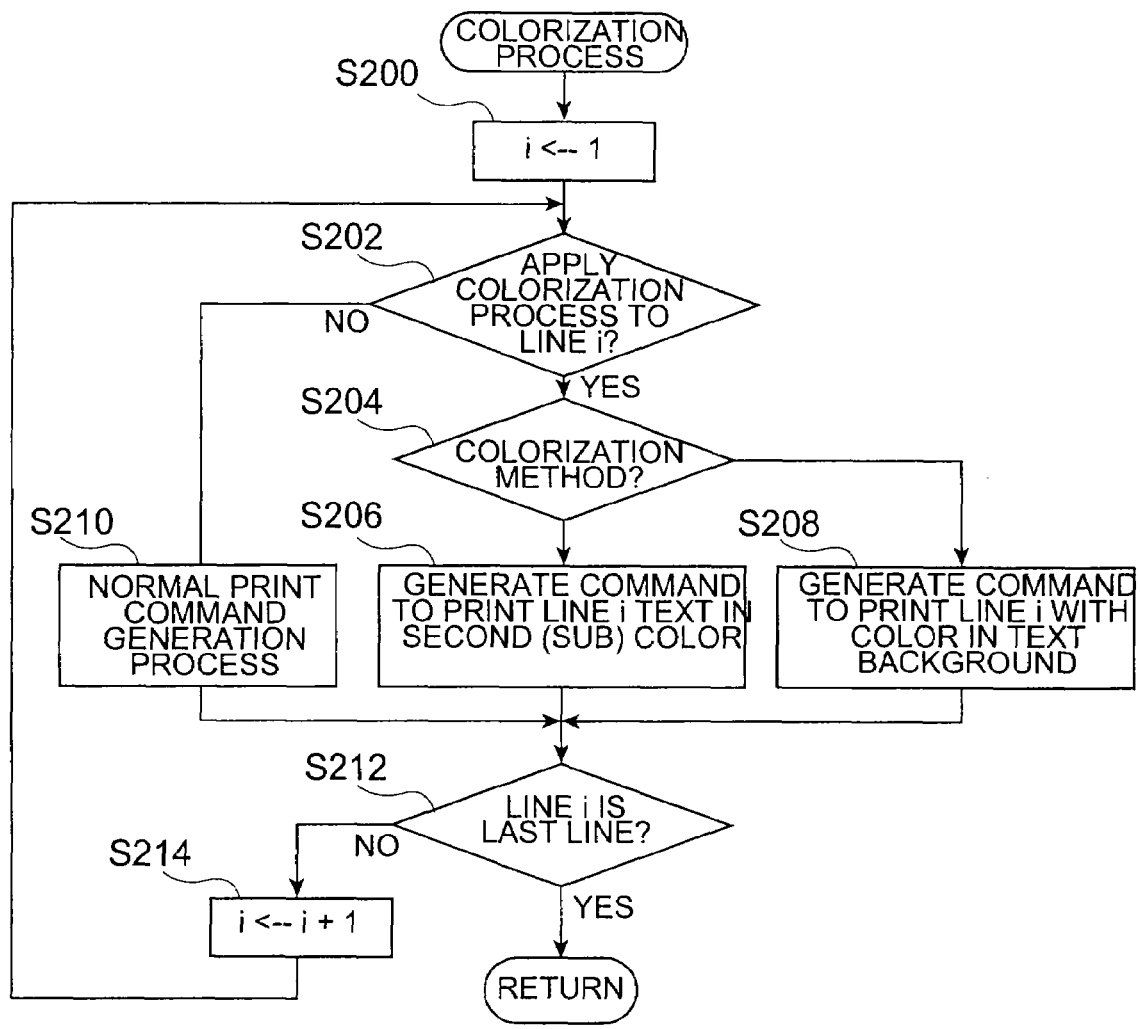
FIG. 7 is a flow chart showing the colorization process of a first embodiment of the invention in detail.

FIG. 7 is a flow chart showing the details of the colorization process run in step S108. The index i denoting the line to be processed is first initialized to 1 (S200). Based on the line unit value in the colorization information 38, whether line i is to be processed by the colorization process is determined (S202). If it is to be colorized, whether the colorization method is text color or background color is determined (S204). If the colorization method is text color, a text print command for printing the text in line i in the second (sub) color is generated (S206). If color is to be added to the background, however, a text print command is generated for printing line i with the background pattern specified in the colorization information printed in the second (sub) color (S208). On the other hand, if step S202 determines that the colorization process does not apply to line i, a normal command generation process is run to generate a text print command for printing the text in line i in the first (main) print color (S210).

Whether line i is the last line is then determined (S212). If it is not the last line index i is incremented by 1 (S214), and control loops back to step S202. If line i is the last line, control returns to the process shown in FIG. 6.

Referring again to FIG. 6, if the print data is determined to be image print data in step S106, the image data print color is determined from the colorization information 38 (S110). If the image data print color is the first (main) color, the normal command generation process runs in step S104. However, if the image data print color is the second (sub) color, an image print command is generated for printing the image data in the second (sub) color (S112).

The print command generated in step S104, S108, or S112 is then sent to the printer 12 (S114). As described above with reference to FIG. 2, the printer 12 runs a printing process according to the print commands received from the host 10, and an easy-to-read receipt with color added on a line unit basis is issued as shown in FIG. 5.

It should be noted that the example in FIG. 5 shows a case in which the print color of the image part 42 is specified separately from the text part 44. That is, the image part 42 in FIG. 5, which might be a store logo, is printed using the color specified for the image, and the product name and price information in the text part 44 is printed with color added by line unit to either the text or the text background. The result is a receipt that is easier to read.

Figure 8:
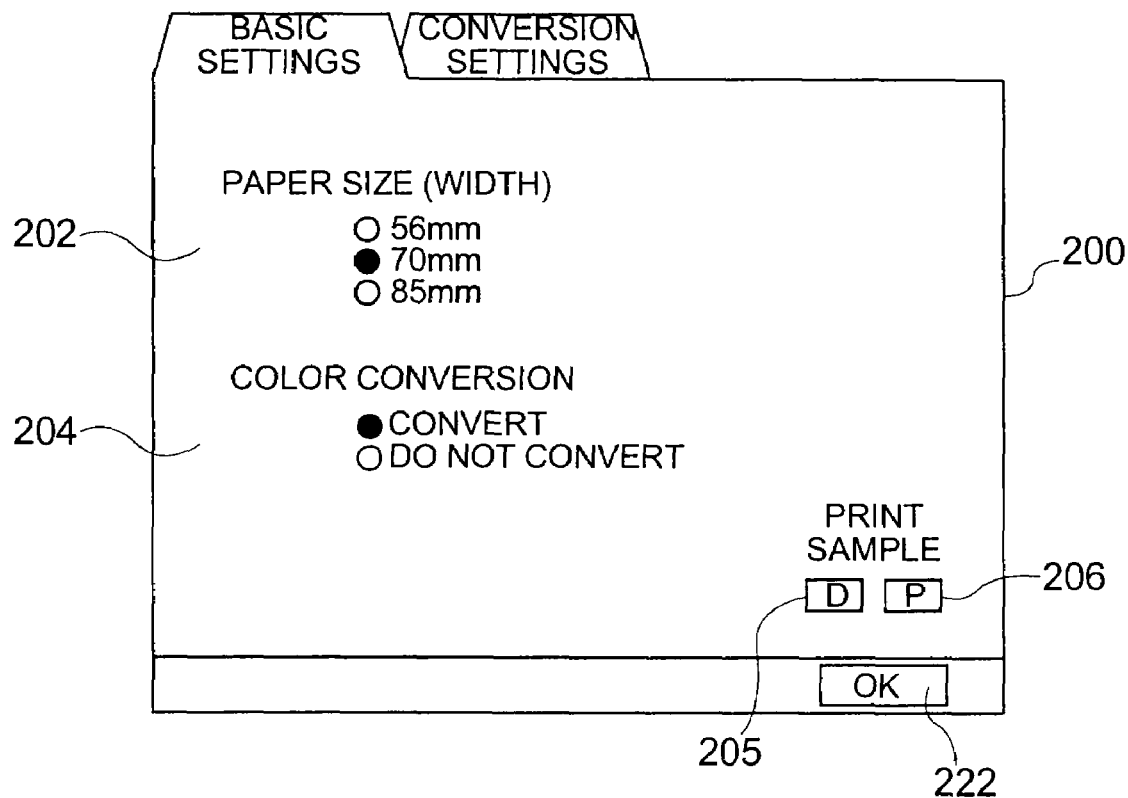
FIG. 8 shows an example of a basic setup window in a first embodiment of the invention.
Figure 9:
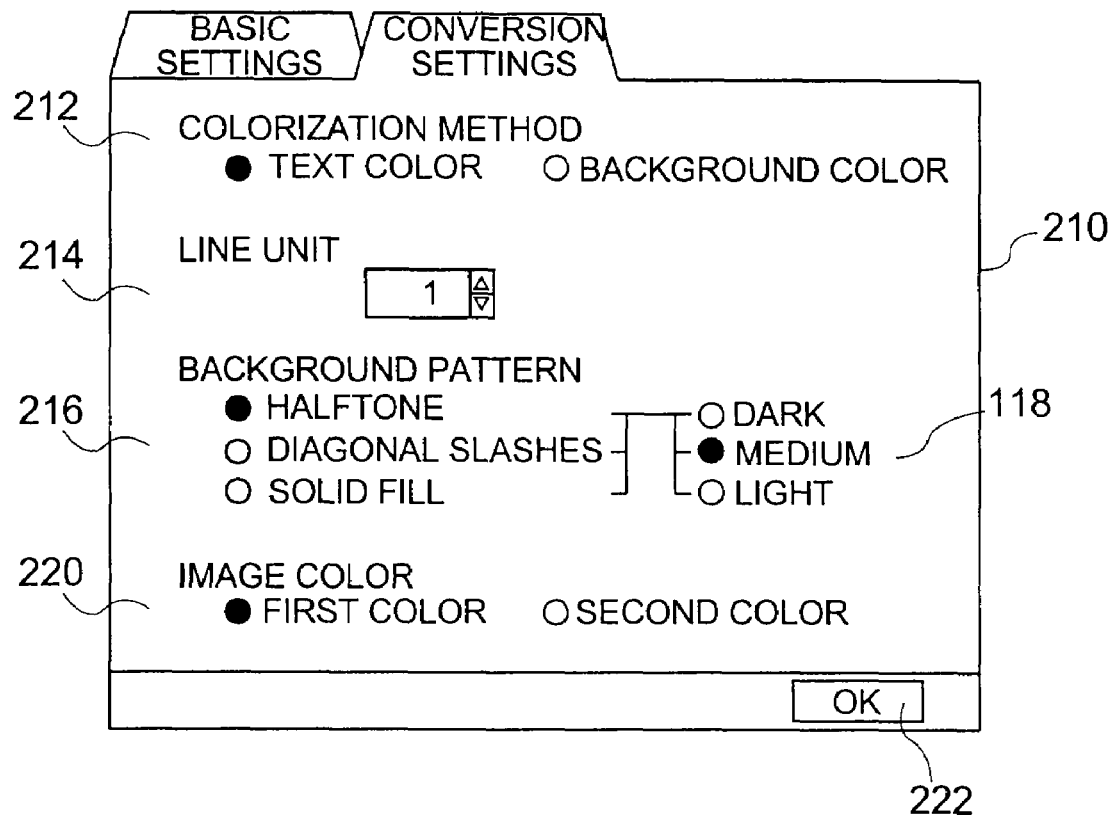
FIG. 9 shows an example of a color conversion settings window in a first embodiment of the invention.

Defining the colorization information 38 by means of the colorization information setup unit 40 is described next. The colorization information setup unit 40 is achieved by the host 10 running a specific setup program. When this setup program runs setup windows 200, 210 such as shown in FIG. 8 and FIG. 9 are presented on the display 16. When the setup program starts a basic setup window 200 such as shown in FIG. 8 is displayed. The user can switch between this basic setup window 200 and a conversion settings window 210 as shown in FIG. 9 by selecting the appropriate tab at the top of the window.

As shown in FIG. 8, the basic setup window 200 has a paper width setting 202 for selecting the paper width and a color conversion setting 204 for selecting whether to apply (enable) the colorization process.

As shown in FIG. 9, the conversion settings window 210 has an input field for setting the colorization information 38 for each item, that is, an input field 212 for setting the text color or the background color, an input field 214 for setting the line unit of the colorization process, an input field 216 for setting the background pattern, an input field 218 for setting the background tone, and an input field 220 for setting the image color. It should be noted that in the example shown in FIG. 9 the value entered into input field 214 specifies the number of lines in the line unit as a numeric value that can be increased or decreased by clicking on the up and down arrows shown to the right of the input box. Values for the fields other than field 214 are defined by clicking the check box or radio button provided adjacent to each available choice. It should be noted that when the setup program starts up the current colorization flag 36 and colorization information 38 stored in the colorization information storage unit 34 are read, and the values therefrom are set as the values initially displayed in the corresponding selection fields in the basic printing setup window 200 and color conversion settings window 210.

The basic setup window 200 and conversion settings window 210 share a common OK button 222. Clicking the OK button 222 stores the content set in field 204 as the colorization flag 36 and the content set in fields 212 to 220 as the colorization information 38 in colorization information storage unit 34. The basic setup window 200 has an entry section 201 for visually checking the colorization settings by printing or displaying a sample receipt. A button 205 is for indicating on the display a sample receipt produced according to the colorization information for user's referencing and a button 206 is for printing a sample receipt as shown in FIG. 5. The sample receipt is produced based on data preset in a memory as quasi-sales information.

Once the colorization information 38 is thus set and print data is subsequently output from the POS application program 24, the colorization process described above is applied according to the set content of the colorization information 38, and the print data is printed in two colors by the printer 12.

As described above a colorization process is applied by this embodiment of the invention according to the colorization information 38 to the monochrome print data output from the POS application program 24 to generate and send a color print command to the printer 12. It is therefore possible to print in two or more colors from a color printer 12 even when the POS application program 24 is only compatible with a monochrome printer by simply changing the printer control program. This first embodiment of the invention therefore makes it possible to issue easy-to-read receipts printed in two or more colors without financially burdening the POS system user, that is, the store.

Furthermore, because the data processing part 30 handling the colorization process is embedded in the service object (SO) 22, i.e., printer driver, providing an interface between the POS application program 24 and printer 12, color printing can be achieved by simply replacing the existing printer driver with this service object (SO) 22.

Furthermore, because the process of adding color to text data is applied by print line unit, the print content can be clearly differentiated by line unit, thereby making the printed receipt easy to read. More specifically, the correlation between product name and price printed on the same line of the receipt is easier to understand, and it is easier to prevent the eyes from skipping a line when reading the price for a particular product.

This embodiment of the invention also makes it possible to separately specify how color is used for image data and text data. It is therefore possible to print the store logo, for example, using the color preferred by the store while still making it possible to issue an easy-to-read receipt printed in two or more colors.

Furthermore, because the colorization process is applied according to the colorization information 38 stored in the colorization information storage unit 34, printing in two or more colors according to user preferences is possible by appropriately setting the colorization information 38 using the colorization information setup unit 40.

Yet further, the colorization information 38 can be setup by simply selecting the desired available options and values from the setup windows 200 and 210 as shown in FIG. 8 and FIG. 9. More specifically, a system according to this embodiment of the invention provides an easy-to-use user interface for defining the colorization information 38, and a printing format using two or more colors can be easily set using simple setup dialogs 200 and 210.

It should also be noted that in a two-color ink-jet printer exemplified by this printer 12 the frequency of printing with the second (sub) color is generally low and the second color of ink is therefore consumed more slowly than the first (main) color of ink. Because the second color of ink may thus be left in the printer 12 without being accessed for a relatively long period, the ink viscosity could increase and the composition of the ink could degrade, thus leading to such problems as clogging of the print head or the print nozzles. This first embodiment of the invention addresses this problem by printing with the second (sub) color even when monochrome print data is output from the POS application program 24. The second (sub) color of ink is therefore used with approximately the same frequency as the first (main) color of ink, and print head clogging and other such problems can therefore be prevented.

Figure 11:
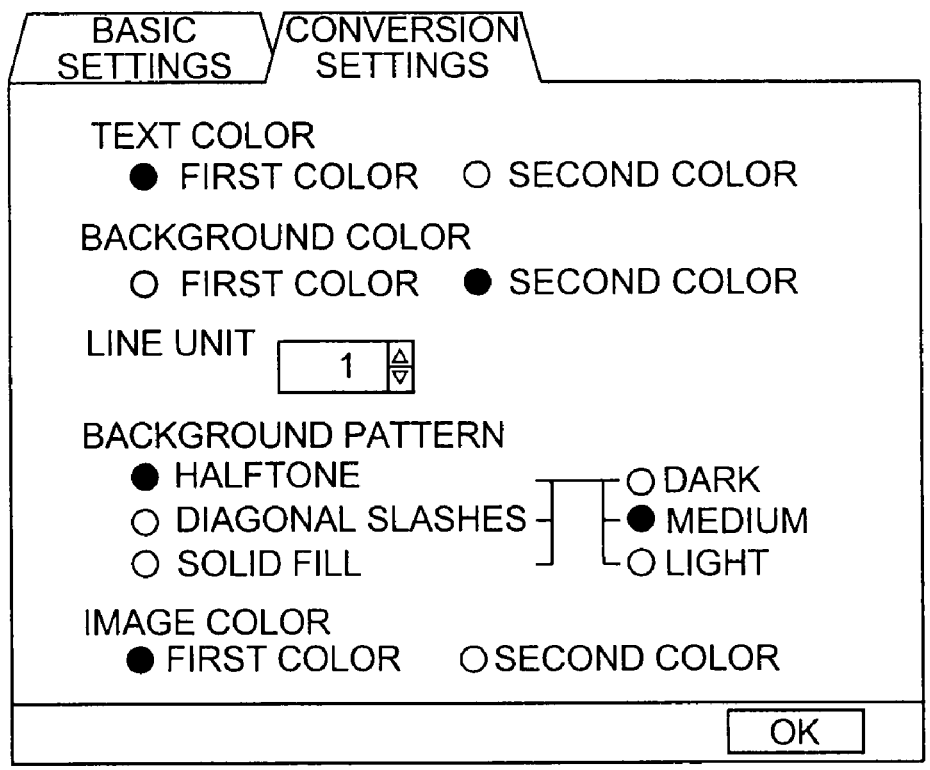
FIG. 11 shows an example of a conversion settings window when the text color and background color can be separately defined in a first embodiment of the invention.

It should be further noted that color can be added to text data in this first embodiment by specifying the text color or a background color for text data, but the invention shall not be so limited. It is also possible, for example, to separately specify both the text color and background color for text data. FIG. 10 and FIG. 11 respectively show examples of the colorization information 38 and color conversion settings window 210 that can be used to make these settings. It is thus possible specify printing a background using the first (main) color behind text printed in the second (sub) color, thus increasing the variations possible with two-color printing.

Furthermore, while the number of lines specified by the line unit setting repeats as a unit of lines printed with color and printed without color in this first embodiment, it is also possible to separately define the number of lines printed with color and printed without adding color. In this case the number of lines printed with color and the number of lines printed without color may be different.

Furthermore, the printer 12 in this first embodiment is a printer capable of printing two colors, but the invention shall not be so limited. It will be apparent that this invention can also be applied to printers capable of printing three or more colors, including printers 12 capable of printing mixed colors by simultaneously printing the first (main) color and second (sub) color, and printers 12 with a print head capable of printing three or more colors.

Figure 13:
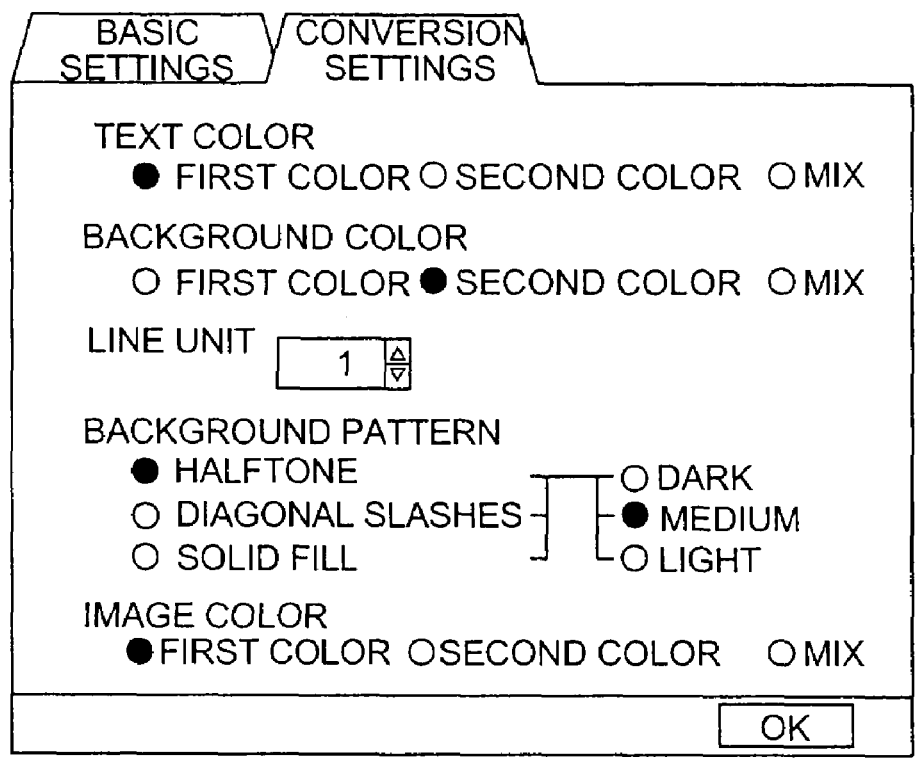
FIG. 13 shows an example of a conversion settings window for a printer having a function for printing in three colors, a first color, a second color, and a blend of the first and second colors, in a first embodiment of the invention.

FIG. 12 and FIG. 13 show an example of the colorization information 38 and color conversion setup window for a printer 12 with a function for printing three colors: the first (main) color, second (sub) color, and a blend or mixture of the first and second colors. In the examples shown in FIG. 12 and FIG. 13 the print color for text, the background, and images can be selected from these three choices, i.e., the first color, second color, and a mixed color.

It will also be noted that while the first embodiment has been described with reference to printing receipts in a POS system, the invention shall not be so limited. More specifically, the present invention can be widely applied for any purpose printing in two or more colors based on monochrome print data using a printer capable of printing in two or more colors.

Furthermore, as a preferred embodiment of this invention the first embodiment is able to define the content of the colorization process separately for images and text data. The invention shall not be so limited, however, and could simply enable adding color by line unit to a least text data.

Yet further, the colorization information setup unit 40 in this first embodiment is described as part of the host 10 controlling the printer 12. The invention shall not be so limited, however, and the colorization information setup unit 40 could be provided as a colorization information setup device separate from the host 10. In this case the colorization information 38 specified using the colorization information setup unit 40 is sent to the host 10 or stored to memory shared with the host 10 so that the colorization information 38 can be referenced by the host 10.

Embodiment 2

A second embodiment of the invention will be described below with reference to FIGS. 14 to 18. As will be explained in detail, a main difference between the first and the second embodiments resides in the fact that in the first embodiment the colorization process, if any, is performed in the host, whereas in the second embodiment it is performed in the printer.

Figure 14:
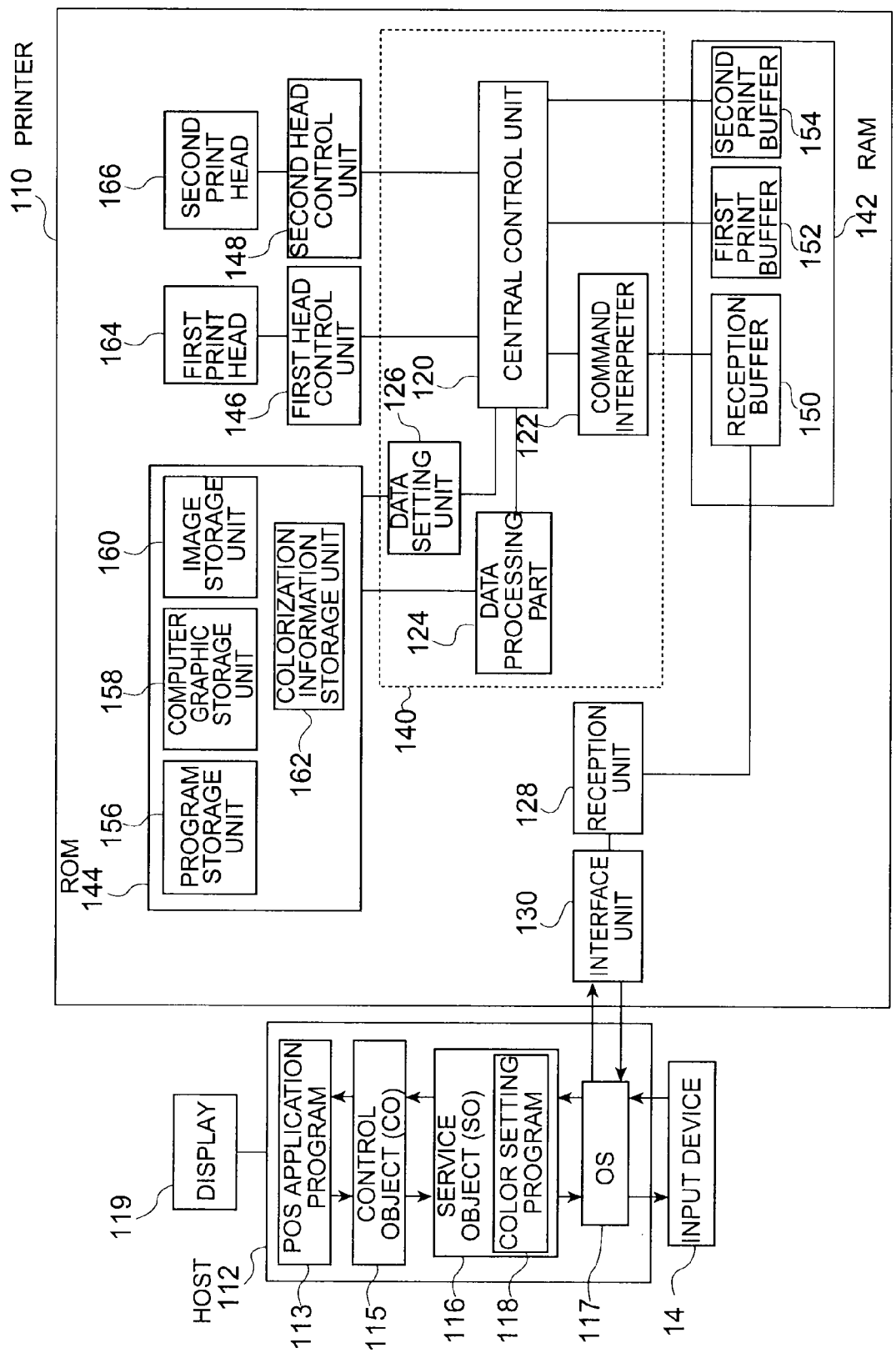
FIG. 14 is a block diagram of a POS system according to a second embodiment of the present invention.

FIG. 14 is a block diagram showing the overall configuration of a POS system according to a second embodiment of the invention. As shown in the figure a POS system according to this second embodiment has a printer 110 and host 112.

The printer 110 is a color ink-jet printer, for example, capable of printing two colors, a first (main) color such as black and a second (sub) color such as red or blue, and prints receipts according to print commands and/or print data sent from the host 112. It should be noted that as in the first embodiment the printer 110 shall not be limited to a two-color printer, and could be a color printer capable of printing three or more colors. The printer 110 is also not limited to an ink-jet printer, and could be a thermal transfer printer or other type of printer capable of printing in two or more colors.

Furthermore, the host 112 is typically a computer system, and printer 110 controls the printer 110 by means of a printer driver operating under control by a suitable operating system such as Windows®. The printer driver provides a device independent interface between a POS application program 113 running on the OS and the printer 110. To achieve this functionality the printer driver has a device control object (CO) 115 for each device category and a service object (SO) 116 for each device model.

The POS application program 113 tabulates sales data based on the product codes for the products input from the input device 114, and outputs print data for printing the tabulated result as a receipt. The print data output from the POS application program 113 is passed to the printer control object (CO) 115, and is passed from the control object (CO) 115 to the service object (SO) 116 corresponding to the particular printer 110 model. The service object (SO) 116 processes the print data for the printer to generate a print command according to the command specifications of the printer 110, and then sends the print command to the printer 110 through the OS 117. The service object (SO) 116 thus absorbs differences between different models of devices (specifically printers in this embodiment), and thus enables the POS application program 113 to be written as a program that is not dependent on a particular device model.

A colorization setup program 118 for setting the colorization information stored in the printer 110 as described below is embedded in the service object (SO) 116. The colorization setup program 118 provides an interface for setting the colorization information by displaying specific windows and dialogs on the display 119.

Print commands sent from host 112 to the printer 110 include commands for printing text (called "text print commands") and commands for printing images (called "image print commands"). The printer 110 can print both text and images in response to the text print commands and image print commands applied thereto. In this second embodiment of the invention the print commands output by the host 112 are monochrome print commands. The printer 110 has a function for applying a colorization process to monochrome print commands in order to print monochrome data with two printable colors. This function is called "colorization" below.

Commands related to image printing include ESC*, ESC L, and GS/. Command GS/, for example, tells the printer 110 to print an image previously stored in the printer 110. This second embodiment of the invention prints images such as a store logo pre-registered in the printer 110 to a receipt by using command GS/. Because the image print command uses a specific command code, the printer 110 can easily distinguish image print commands from text print commands.

The printer 110 shown in FIG. 14 has a central control unit 120, command interpreter 122, data processing part 124, data setting unit 126, and reception unit 128. The central control unit 120 interprets commands and data received from the host 112 by the reception unit 128 through the interface unit 130 with the command interpreter 122, and runs a process according to the received command. The central control unit 120, command interpreter 122, data processing part 124, and data setting unit 126 are functional units that can be achieved by the CPU 140 running a particular control program.

Connected to the CPU 140 are RAM 142, ROM 144, first head control unit 146, and second head control unit 148.

Provided in RAM 142 are a reception buffer 150, first print buffer 152, and second print buffer 154. Commands and data received from the host 112 by the reception unit 128 are stored to the reception buffer 150. First (main) color print data is stored in a bit data format to the first print buffer 152, and second (sub) color print data is similarly stored to the second print buffer 154.

Provided in the ROM 144 are a program storage unit 156 for storing the control program run by the CPU 140, computer graphic storage unit 158 for storing bit patterns for each character and bit patterns for the background added to text, an image storage unit 160 for storing logos and other image data to be printed to the receipts, and a colorization information storage unit 162 for storing colorization information as further described below.

It should be noted that ROM 144 is composed of a rewritable ROM such as EEPROM and a mask ROM or non-writable ROM storing firmware embedded in the CPU 140, the program storage unit 156 is disposed in non-writable ROM, and the computer graphic storage unit 158, image storage unit 160, and colorization information storage unit 162 are disposed in a rewritable ROM device. The computer graphic storage unit 158 could be disposed in any ROM device.

A first print head 164 is connected to first head control unit 146, and a second print head 166 is connected to second head control unit 148. The first print head 164 and second print head 166 are print heads for printing the first and second colors, respectively, and print the print data stored to first print buffer 152 and second print buffer 154 in the first and second colors as controlled by the first head control unit 146 and second head control unit 148.

The command interpreter 122 interprets commands stored to the reception buffer 150 and determines if the print command is a text print command or image print command. The result is passed with the print data specified by the print command to the data processing part 124. Based on the received data the data processing part 124 stores the print data in a bit data format to the first print buffer 152 and second print buffer 154 as further described below.

If the colorization function noted above is not enabled (that is, if the colorization flag stored to the colorization information storage unit 162 described below is not set), the data processing part 124 reads the bit pattern data for each character to be printed from the computer graphic storage unit 158 for the print data in the text print command, and stores the bit data to the first print buffer 152. For image print commands the bit image data for the image to be printed is read from the image storage unit 160 and stored to the first print buffer 152. The first print head 164 is then driven to print data stored to the first print buffer 152 in one color, i.e., the first (main) color.

If the colorization function is enabled, the data is printed in two colors by running a specific colorization process according to the content of the colorization information stored to the colorization information storage unit 162. Details of this colorization process are described further below.

FIG. 15 shows an example of the content of the colorization information. As shown in the figure the colorization information includes a colorization flag, image printing color, text printing color, text background flag, and text line unit. These are described below.

(1) Colorization flag: Declares whether the colorization function is enabled or disabled. If the flag is set the colorization function is enabled.

(2) Image printing color: Specifies whether to use the first (main) or second (sub) color for printing images.

(3) Text printing color: Specifies whether to use the first (main) or second (sub) color for printing text.

(4) Text background flag: Specifies whether to add a background color to text.

(5) Text line unit: Declares the number of lines in one line unit for applying the colorization process. For example, if the line unit value is 2, two lines to which the colorization process is applied and two lines to which the process is not applied alternate as in the first embodiment shown in FIG. 5.

The content of the colorization information can be set by specific color setup command sent from the host 112 to the printer 110. This color setup command is formatted with a command code and parameters such as shown below:

ESC X n1, n2, n3, n4, n5 where parameters n1 to n5 correspond to the above fields (1) to (5) in the colorization information and are declared as follows:

n1: Declares whether the colorization function is enabled (enable=1; disable=0)

n2: Declares whether to print images with the second (sub) color (second color=1; first color=0)

n3: Declares whether to print text with the second (sub) color (second color=1; first color=0)

n4: Declares whether to print the text background with the second (sub) color (print=1; do not print=0)

n5: A number specifying the number of lines in one line unit

It should be noted that each parameter does not need to correspond to one field in the colorization information, and one parameter could correspond to multiple fields. For example, because parameters n1 to n4 can be expressed with a 4-bit value, a single parameter representing these four bits and a single parameter denoting the size of the line unit could be used so that all five fields (1) to (5) above are expressed with two parameters. Various formats can also be used to specify the above five fields (1) to (5) as parameters of the color setup command.

When the printer 110 receives this color setup command it specifies the content of the colorization information by means of the data setting unit 126.

It should be noted that the command code ESC X is defined by the printer manufacturer and can be interpreted by a specific printer. Any code that can be differentiated from other commands and interpreted by a specific printer can therefore be used as the above-noted command code ESC X.

Figure 16:
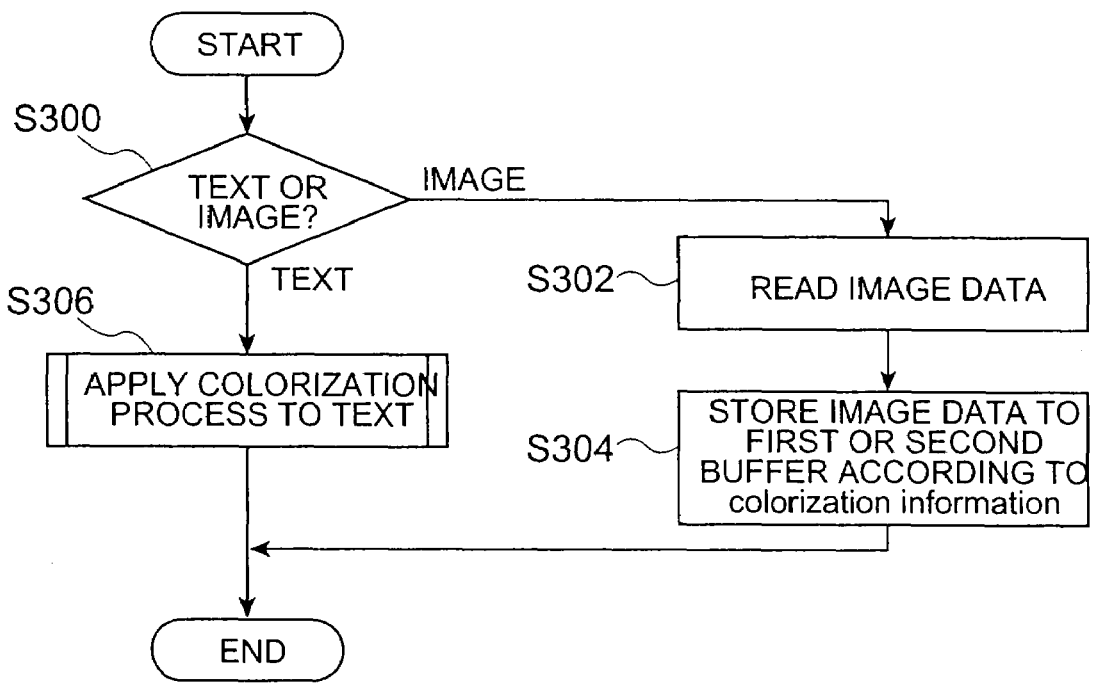
FIG. 16 is a flow chart of a process run by the data processing part when the colorization function is enabled in a second embodiment of the invention.

FIG. 16 is a flow chart of the process run by the data processing part 124 when the colorization function is enabled (that is, when the colorization flag is set). As shown in FIG. 16, whether the print command is a text print command or image print command is determined first (S300). If it is an image print command, the bit image data for the image specified in the print command is read from the image storage unit 160 (S302) and stored to the first print buffer 152 or second print buffer 154 according to the value of the image printing color in the colorization information (S304). More specifically, if the image printing color is set to the first (main) color, the image data is stored to the first print buffer 152, which is assigned to the first (main) color, but if the image printing color is set to the second (sub) color, the image data is stored to the second print buffer 154, which is used for the second color.

On the other hand, if the print command is a text print command, the colorization process is applied to the text data specified for printing by the print command based on the colorization information (S306).

Figure 17:
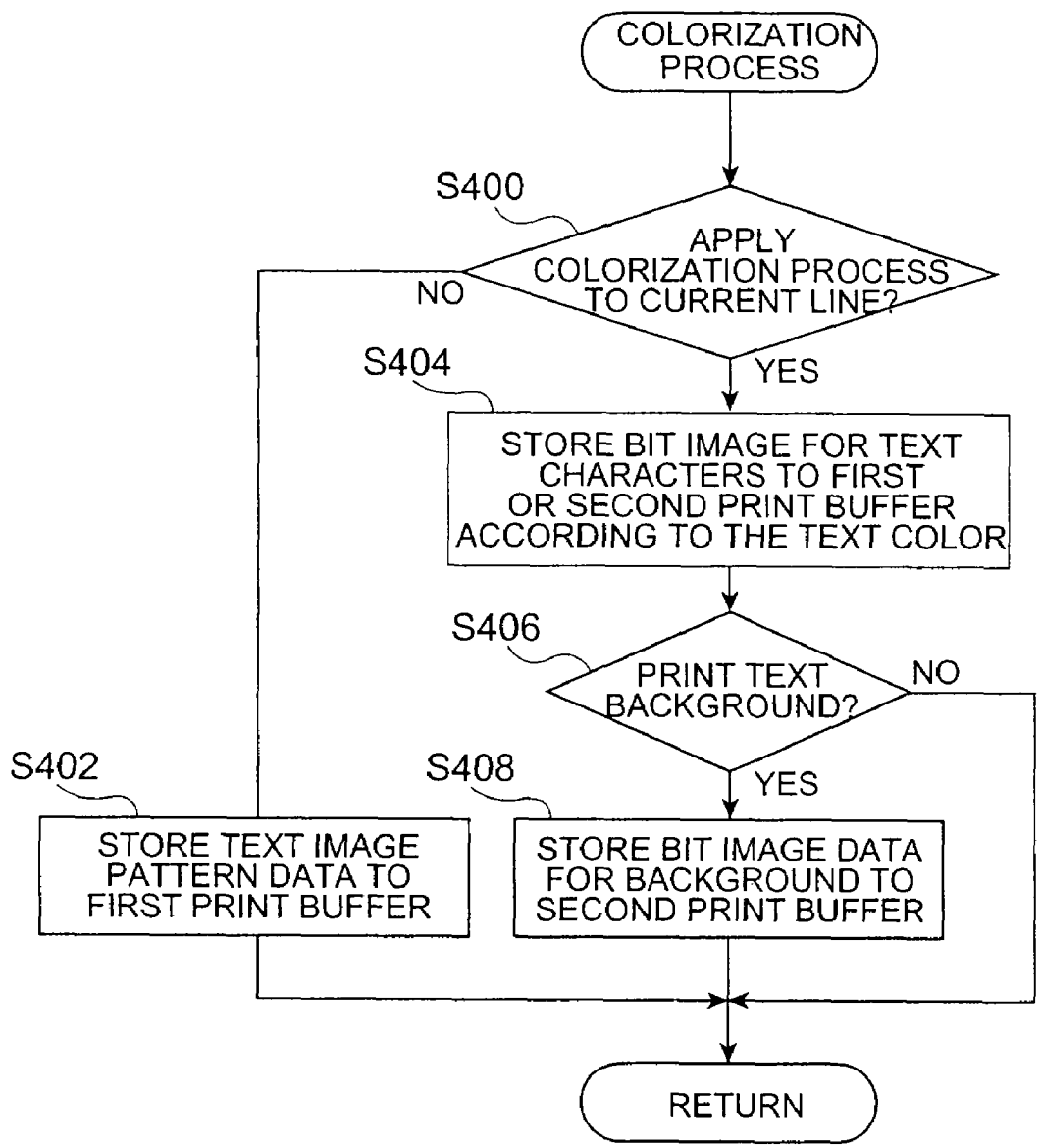
FIG. 17 is a flow chart showing the content of a colorization process for text data in a second embodiment of the invention.

FIG. 17 is a flow chart of the colorization process applied to the text data in step S306 in FIG. 16.

As shown in FIG. 17 the first step is to determine whether the colorization process is to be applied, i.e., whether color is to be added, to the current line based on the line unit value in the colorization information 38 (S400). It should be noted that by counting the carriage return codes in the text print data to count the line number of the current line in the text, the data processing part 124 can determine whether the current line is to be processed by the colorization process based on the counted current line number and the line unit value. If the data processing part 124 determines that the current line is not be processed by the colorization process, the image pattern data for the text characters is read from the computer graphic storage unit 158 and stored to the first print buffer 152 (S402), and the current iteration of the colorization process ends.

However, if the colorization process is to be applied to the current line, the image pattern data for the text characters is read from the computer graphic storage unit 158 and stored to the first print buffer 152 or second print buffer 154 according to the text color setting in the colorization information (S404). More specifically, if the color for printing text is the first (main) color, the bit images for the printed characters is stored to the first print buffer 152, but if it is the second (sub) color, the bit image data is stored to the second print buffer 154.

Whether the text background flag in the colorization information is set is then determined (S406). If the text background flag is not set (no background is to be printed), the current iteration of the colorization process ends. If the text background flag is set, however, the bit pattern data for the background pattern is read from the image storage unit 160 and stored to the second print buffer 154 (S408), and the colorization process then ends.

The data processing part 124 thus stores print data to the first print buffer 152 or second print buffer 154 according to the colorization information for both text and image print commands. As described above, data is thus printed in the first (main) color and second (sub) color according to the print data stored to the first print buffer 152 and second print buffer 154, respectively. The above-described process applied by the data processing part 124 therefore enables printing a two-color receipt such as shown in the example in FIG. 5 according to the content of the colorization information based on a monochrome print command.

It should be noted that the print data stored to the first print buffer 152 and second print buffer 154 in steps S304, S402, and S408 above in this second embodiment corresponds to the color print data in the accompanying claims of this invention.

Setting the colorization information in the host 112 in this embodiment is described next. The colorization information can be set by running a colorization setup program 118 on the host 112. When the colorization setup program 118 is started up a settings window 300 such as shown in FIG. 18 is presented on the display 19 of the host 112.

Figure 18:
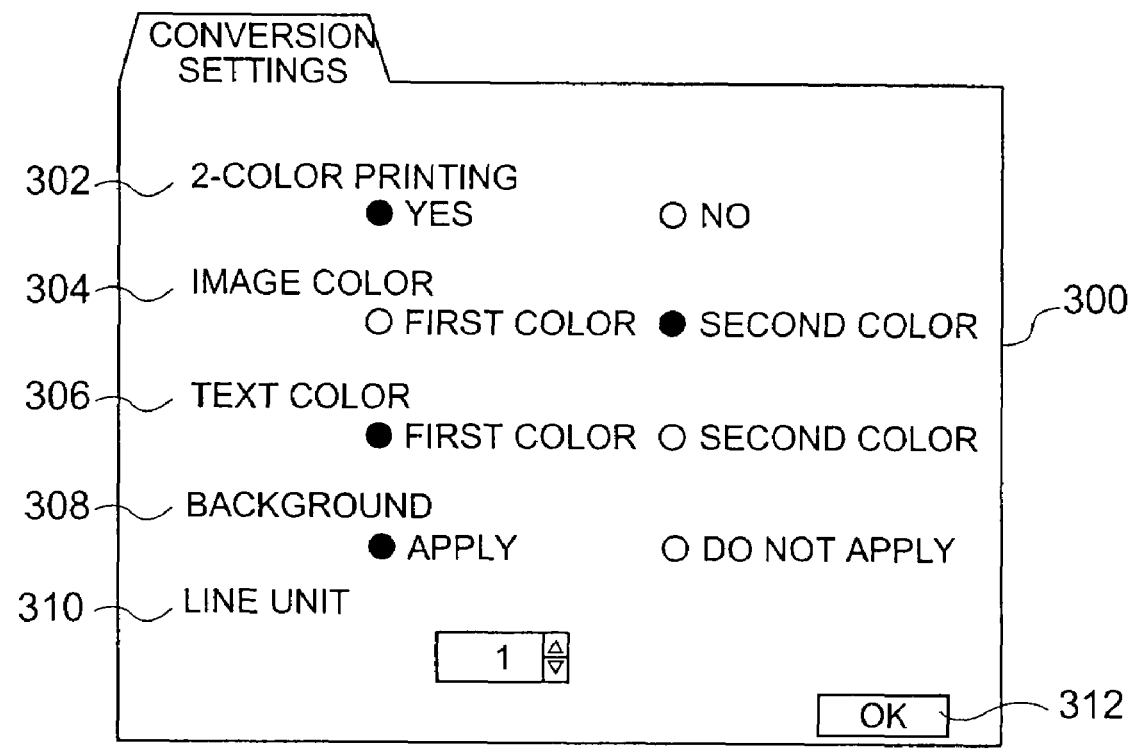
FIG. 18 shows an example of a setup screen for setting the colorization information on the host in a second embodiment of the invention.

As shown in FIG. 18 this settings window 300 has a field 302 for selecting two-color printing (i.e., turning the colorization function on or off), a field 304 for setting the image printing color, a field 306 for setting the text printing color, a field 308 for selecting whether to print a text background, a field 310 for setting the number of lines in each line unit, and an OK button 312. When the colorization setup program 118 starts up a command is sent to the printer 110 to read the colorization information, and the content of the colorization information returned in response to this command is initially displayed in the corresponding fields in the settings window 300.

When the OK button 312 in the settings window 300 is clicked a color settings command is generated and sent to the printer 110 based on the content of each field.

For example, if two-color printing is on, the image printing color is set to the second (sub) color, the text printing color is set to the first (main) color, the text background is on, and the line unit count is 2, the color settings command ESC X 11012 is sent to the printer 110. The data setting unit 126 of the printer 110 then sets the colorization information based on this color settings command.

When a monochrome print command is sent from the host 112 to the printer 110 in this second embodiment of the invention the colorization function of the printer 110 applies a colorization process according to colorization information to add a second color and print in two colors. As a result, even if the POS application program 113 run by the host 112 is only compatible with a monochrome printer, a color printer 110 can be used to print in two or more colors without making any changes to the program or printer driver on the host 112 side. It is therefore possible with this second embodiment of the present invention to issue easy-to-read receipts printed in two or more colors without financially burdening the POS system user, i.e., store. More specifically, this color printer 110 can be installed in a store without changing the existing POS system program, the work and cost involved in updating the POS system can be reduced, and the utilization value can be improved for the store. In the second embodiment as explained so far, the colorization setup program is part of the printer driver. In this case it would thus be necessary to change the printer driver on the host side to enable multichrome printing based on monochrome print data. As in the first embodiment, it is possible, however, to provide such colorization setup program as a separate colorization information setup unit, e.g., embodied on a data carrier, such as a CD, and distributed together with printer 110. By executing such separate program on the host 112, the colorization information could be entered and confirmed in the same way as explained above and multichrome printing based on monochrome print data could be achieved even without requiring the printer driver to be changed compared to that used for monochrome printing.

This second embodiment of the invention can also differentiate between image print commands and text print commands, and can define the content of the colorization process separately for text and images. A store logo, for example, can therefore be printed in the color preferred by the store while still being able to issue easy-to-read receipts in two or more colors. Therefore, if the store has a specific corporate color that color can be used to print a store logo, for example, and impress upon the customer a positive association between that color and the store.

Furthermore, because the colorization information stored in the printer 110 is set according to a color settings command sent from the host 112, the content of the colorization process can be defined on the host 112 side by the user without directly operating the printer 110. In addition, because the colorization information can be set by simply activating the colorization setup program 118 and entering the desired values and settings from a settings window 300 such as shown in FIG. 18, an easy-to-use interface can be provided for the user.

Yet further, because the content of the current colorization information is presented automatically in the settings window 300 when the colorization setup program 118 is activated, the user can readily know what the current settings are.

As noted above, this second embodiment makes it possible to add a second color for two-color printing according to a monochrome print command sent from the host 112. This second embodiment of the invention can therefore also prevent the problems that arise when the second (sub) color is consumed more slowly than the first (main) color because the second color of ink is used at approximately the same frequency as the first color of ink.

It will also be apparent that while the colorization information in this second embodiment is described as specifying the content of the colorization process using such fields as the image printing color, text printing color, text background on/off flag, and line unit value for text to be colored, these fields are used by way of example only. For example, instead of applying the colorization process by text line unit as in the second embodiment, a single print color could be specified for all text. Furthermore, a number of patterns, such as a halftone, diagonal slashes, and solid, can also be stored in the printer 110 so that a desired pattern can be selected. Furthermore, the first and the second embodiments have been described as allowing selection of the print color for image data which means the image data remain monochrome data even though the print-out (e.g. the receipt or other document) becomes multichrome because either text and image are printed in different colors or the text data have been converted to multichrome data. While converting monochrome text data to multichrome text data in the manner described above may be easier, it should be noted that it is also possible to convert monochrome image data to multichrome image data. One possibility is printing the stored image (e.g., a store logo) in one selected color and superimposing a selected pattern in one or more other colors. Another possibility is to separate the stored image data into two or more portions based on a predetermined algorithm and printing each portion in a different color. The algorithm could, for instance, separate the stored image data into image portions of low density and image portions of high density to apply different colors to these portions.

The printer 110 shall also not be limited to printing two colors, a first (main) color and second (sub) color, and could be designed to print a mixed color by simultaneously printing the first and second colors. In this case each of the printing colors defined in the colorization information could be selected from among three colors: the first color, second color, and a mix thereof. Color data for which the color mix is selected in this case is stored to both the first print buffer 152 and second print buffer 154 of the printer 110 and the same pattern is printed by the first print head 164 and second print head 166 to print the color blend. If the printer 110 has a print head and a function for printing three or more colors, the image and text printing colors can be selected from any of the colors printable by the printer 110.

Various printing features can thus be used as the colorization information. What is important is that the present invention makes it possible to use the colorization information to specify how monochrome print data is printed in two or more colors, and the color settings command has a format able to specify the content of each print feature corresponding to the features defined in the colorization information.

It should also be noted that this second embodiment of the invention is described with application to printing receipts in a POS system. The invention shall not be so limited, however, and can be widely applied to printing in two or more colors based on a monochrome print command by means of a printer capable of printing in two or more colors.

EFFECTS OF THE INVENTION

As will be understood from the preceding description, the present invention enables printing in two or more colors based on print data for monochrome printing.

The present invention also enables the user to set how color is applied when generating the print data for printing in two or more colors from print data for monochrome printing.

Furthermore, the present invention can also print in two or more colors based on print data for monochrome printing while differentiating between image and text data.

Yet further, the present invention can print in two or more colors according to a monochrome print command received by the printer.

It is therefore possible to install a color POS printer in a store using a POS system designed for monochrome printing without changing the existing POS system program, thereby reducing the work and cost involved in updating the system, and thus improving the value of the system for the store.

While preferred embodiments of the invention have been described and illustrated, further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A system for performing a colorization process from monochrome print data to color data for printing a receipt or other sales document in two or more colors, the system comprising:
   an application for displaying a user interface for setting colorization information for performing the colorization process, the user interface including:
      a component for setting a color of text,
      a component for setting a background color, and
      a component for setting a background style having alternating background color and non-colored portions, the background style setting component enabling the setting of a frequency of the alternating background color and non-colored portions on a number of lines basis; and
   a memory in which the colorization information set via the user interface is stored and from which colorization information can be read for display;
   wherein the user interface enables visual confirmation of the settings to be used in the colorization process, and
   wherein the color of text and the background color are set independently.

2. The system of claim 1, wherein the user interface further comprises a component for setting a background pattern.

3. The system of claim 1, wherein the user interface further comprises a component for setting an image color.

4. The system of claim 1, wherein each of the text and background can be set to one or the other of two colors.

5. The system of claim 1, wherein the application for displaying the user interface comprises a point-of-sale application.

6. The system of claim 1, wherein the system includes a point-of-sale printer.

7. A method for performing a colorization process from monochrome print data to color data for printing a receipt or other sales document in two or more colors, the method comprising:
   displaying a user interface for setting colorization information for performing the colorization process, the user interface including a component for setting a color of text, a component for setting a background color, and a component for setting a background style;
   receiving and processing colorization information settings, including a text color setting, a background color setting and a background style setting, input via the user interface: and
   storing the colorization information set via the user interface;
   wherein the user interface enables visual confirmation of the settings to be used in the colorization process; and
   wherein the component for setting the background style includes functionality for setting the background as alternating background color and non-colored portions and a frequency of the alternating background color and non-colored portions on a number of lines basis, and
   wherein the color of text and the background color are set independently.

8. The method of claim 7, wherein:
   the receiving and processing of the background style setting comprises receiving and processing a request to alternate the background color and non-color portions at a specific frequency.

* * * * *